(12) United States Patent
Nishiji

(10) Patent No.: US 6,935,981 B2
(45) Date of Patent: Aug. 30, 2005

(54) TWO-SPEED TORQUE-SPLITTING INTERAXLE TRANSFER CASE

(75) Inventor: Makoto Nishiji, Kumagaya (JP)

(73) Assignee: Toyoda Machine Works, Ltd., Kariya (JP)

(*) Notice: Subject to any disclaimer, the term of this patent is extended or adjusted under 35 U.S.C. 154(b) by 0 days.

(21) Appl. No.: 10/616,562

(22) Filed: Jul. 10, 2003

(65) Prior Publication Data
US 2005/0009660 A1 Jan. 13, 2005

(51) Int. Cl.⁷ .............................................. F16H 37/08
(52) U.S. Cl. ...................................... 475/205; 475/206
(58) Field of Search .............................. 475/201, 204, 475/205, 206; 180/248

(56) References Cited

U.S. PATENT DOCUMENTS

| | | | |
|---|---|---|---|
| 4,644,822 A | * | 2/1987 | Batchelor .................... 475/204 |
| 4,677,873 A | * | 7/1987 | Eastman et al. ............. 475/204 |
| 5,168,956 A | * | 12/1992 | Namioka .................... 180/248 |
| 5,655,986 A | * | 8/1997 | Wilson et al. .............. 475/204 |
| 5,690,575 A | | 11/1997 | Lippitsch |
| 5,695,426 A | | 12/1997 | Lippitsch |
| 5,700,222 A | | 12/1997 | Bowen |
| 5,902,205 A | | 5/1999 | Williams |
| 6,258,002 B1 | | 7/2001 | Lippitsch |
| 6,554,731 B2 | * | 4/2003 | Brown et al. ................ 475/204 |
| 6,579,204 B2 | * | 6/2003 | Brown et al. ................ 475/204 |

FOREIGN PATENT DOCUMENTS

| | | | |
|---|---|---|---|
| EP | 0925986 | * | 6/1999 |
| JP | 2003-56680 | | 8/2001 |

* cited by examiner

*Primary Examiner*—Ha Ho
(74) *Attorney, Agent, or Firm*—Thomas B. Ryan; Brian B. Shaw, Esq.; Harter, Secrest & Emery LLP (57) ABSTRACT

An interaxle transfer case distributes drive power from an input drive shaft to both a rear propshaft aligned with the input drive shaft and to a front propshaft that is offset from both the input drive shaft and the rear propshaft. Within the transfer case, a planetary gear unit provides for delivering drive power from the input drive shaft to the front and rear propshafts at different speed ratios. A single-pinion differential gear unit within the transfer case provides for unequally dividing drive torque between the front and rear propshafts. Planet gears of the planetary gear unit and pinion gears from the single-pinion differential gear unit are mounted for rotation within a common carrier. The common carrier has one or more extended portions for supporting ends of a transfer case housing.

32 Claims, 4 Drawing Sheets

TWO-SPEED TORQUE-SPLITTING INTERAXLE TRANSFER CASE

TECHNICAL FIELD

The invention relates to interaxle transfer cases of four wheel drive or all wheel drive vehicles and is particularly related to such transfer cases that provide high and low range gear ratios and uneven torque distribution between front and rear drive axles.

BACKGROUND

Interaxle differentials distribute drive power from an onboard power source (e.g., vehicle's engine) between two drive axles (front drive axle and rear drive axle). An input drive shaft conveys engine power to the transfer case, and front and rear output drive shafts convey separate portions of the engine power en route to the front and rear axles.

The power division between output drive shafts is accomplished by a differential gear unit. Unbalanced speed ratios across the differential are provided for imbalancing torque divisions between the output drive shafts. In addition, transfer cases can be arranged to provide a choice of gear ratios between the input drive shaft and the two output drive shafts collectively. Planetary gear units are typically used for this purpose. The planetary gear units can be shifted between positions supporting the different drive gear ratios (typically referred to as high and low ranges).

In a typical configuration, the input drive shaft to the transfer case and the two output drive shafts from the transfer case are aligned with the same axis of rotation. The input drive shaft is typically coupled directly to the transmission, and the rear output drive shaft is typically coupled directly to a rear propshaft. The front propshaft to the front drive axle is typically offset from the common axis of the input and output drive shafts of the transfer case and is connected to the front output drive shaft by a sprocket and chain or other form of parallel-axis drive mechanism.

The multiple gear units and concentric shafts provide challenges for mounting and supporting the transfer case components. For example, in arrangements in which the front and rear output drive shafts emerge together from the gear units, the rear output drive shaft is received in a bearing of the transfer case housing and provides an outboard support for both gear units within the transfer case. In addition, the rear output drive shaft typically provides support for the bending forces generated by the sprocket and chain to the front output. The multiple functions of supporting the interior gear units and parallel-axis drive mechanism require the rear output drive shaft to be dimensioned larger than would otherwise be required for its primary role of conveying a portion of the engine power toward the rear drive axle. The enlarged dimensioning of the rear output drive shaft has the effect of enlarging the overall size of both the planetary gear unit and the differential gear unit within the transfer case. The additional sizing requirements also add weight and cost to the transfer case.

In other configurations, the front output drive shaft emerges from the transfer case in the opposite direction concentric with the input drive shaft. Power take-offs from the front end of the transfer case, however, have the effect of shortening the propshaft to the front drive axle. The front propshaft connects to the front drive axle through a front differential. Any unintended offsets between the front differential and the propshaft's connection to the transfer case produce angular errors in the mounting of the propshaft. The angular errors, which can be particularly detrimental to the smooth transfer of power, are amplified by shorter propshafts. Thus, transfer case arrangements that connect the front output drive shaft of the transfer case to the front propshaft at the front end of the transfer case are subject to undesirable angular misalignments.

Other difficulties arise because of particular gearing arrangements within the planetary and differential gear units. For example, single-pinion differential gear units in which individual pinion gears interconnect internal and external side gears pose special design challenges, particularly for directing front and rear drive shafts from a common end of the transfer case.

SUMMARY OF INVENTION

Reductions in the size, weight, and length of the transfer case are made possible by the present invention. A common carrier can support both (a) gear arrangements for high and low gear ratios and (b) gear arrangements for unbalanced power distributions between front and rear axles. Output shafts of the transfer case can extend from the same end of the common carrier to equalize the lengths of propshafts to the front and rear axles. The input and output shafts of some embodiments can be sized to more closely match their requirements for conveying engine power by reducing or foregoing requirements for providing an outboard support to the interior components of the transfer case.

An exemplary multi-speed torque-splitting interaxle transfer case includes a transfer case housing having front and rear ends and a lateral extension between the front and rear ends. An input drive shaft enters the front end of the transfer case housing, a rear output drive shaft exits the rear end of the transfer case housing, and a drive connection is made with a front output drive shaft through the lateral extension. A single-pinion differential gear unit within the transfer case housing provides for unequally distributing drive torque between the front and rear output drive shafts. A planetary gear unit also within the transfer case housing drives the single-pinion differential gear unit at different drive speed ratios with respect to rotation of the input drive shaft. The single-pinion differential gear unit has an internal side gear, an external side gear, and a plurality of pinion gears each interconnecting the internal and external side gears. The planetary gear unit includes a sun gear, a ring gear, and a plurality of planet gears interconnecting the sun and ring gears. Both the pinion gears of the single-pinion differential gear unit and the planet gears of the planetary gear unit are mounted for rotation within a common carrier. The common carrier has an extended portion that forms a bearing with one end of the transfer case housing for rotatably supporting the carrier within the transfer case housing.

The extended portion of the carrier in accordance with the preferred embodiment forms the bearing with the rear end of the transfer case housing. An external bearing surface rotatively supports the front output drive shaft and an internal bearing surface rotatively supports the rear output drive shaft. The external bearing surface of the extended portion of the common carrier also forms a portion of the bearing with the rear end of the transfer case housing. Thus, instead of requiring the rear output drive shaft to provide a cantilevered support for both gear units within the transfer case housing, this embodiment provides an extended portion of the common carrier of the gear units to perform this function.

The rear output drive shaft, which can be sized more in line with its drive power conveying requirements, passes through a center of the external side gear and is supported by the extended portion of the carrier within the front output drive shaft. To support both output drive shafts, the extended portion of the carrier also passes through the center of the external side gear and extends concentrically between the front and rear output drive shafts. However, the extended portion of the carrier extends in length beyond the front output drive shaft to support the bearing with the rear end of the transfer case housing.

The external side gear is preferably coupled to the front output drive shaft, and the internal side gear is preferably coupled to the rear output drive shaft. The pitch radii of the external and internal side gears differ by an amount approximately equal to the pitch diameter of the pinion gears. A torque division between the front and rear output drive shafts relates to the pitch difference between the external and internal side gears.

The extended portion of the carrier described thus far is preferably a first of two extended carrier portions. The second portion of the carrier preferably supports a bearing with the front end of the transfer case housing for rotatably supporting the carrier within the transfer case housing. The second extended portion of the carrier preferably includes an external bearing surface that forms a portion of the bearing with the front end of the transfer case housing and an internal bearing surface rotatively supporting the input drive shaft. With the common carrier rotatively supported at both ends of the transfer case housing, the input and both output drive shafts of the transfer case can be sized in accordance with their requirements for transferring power and are not relied on to provide cantilevered support for surrounding gearing structures within the transfer case.

Our new transfer case is particularly intended for use within interaxle systems that connect an input drive shaft to concentric front and rear output drive shafts. The input drive shaft and the concentric front and rear output drive shafts are aligned with a common axis of rotation. The input drive shaft is arranged for connection to a source of power. The front output drive shaft is arranged for connection to the front axle, and the rear output drive shaft is arranged for connection to the rear axle. The transfer case has a housing that includes a front end through which the input drive shaft is received, a rear end through which the output drive shaft emerges, and a lateral extension between the front and rear ends through which a drive connection is made with the front output drive shaft.

A planetary gear unit within the transfer case housing delivers power from the input drive shaft to the front and rear output drive shafts at different speed ratios. A single-pinion differential gear unit within the transfer case unequally divides drive torque between the front and rear output drive shafts. The planetary gear unit includes sun and ring gears and is connected by planet gears. The single-pinion differential gear unit includes internal and external tooth side gears interconnected by individual pinion gears. A common carrier mounts both the planet gears of the planetary gear unit and the pinion gears of the single-pinion differential gear unit for rotation about their respective axes. The common carrier is mounted for rotation on a bearing supported by the transfer case housing.

Within this interaxle system, the rear output drive shaft is preferably aligned with a rear propshaft that delivers power to the rear axle, and the front output drive shaft is offset from a front propshaft that delivers power to the front axle. The drive connection between the front output drive shaft and the front propshaft is preferably adjacent to the rear end of the transfer case housing for more closely equating links of the front and rear propshafts.

Within the single-pinion differential gear unit, the internal tooth side gear is connected to the rear output drive shaft and the external tooth side gear is connected to the front output drive shaft. The internal tooth side gear has a pitch radius that is larger than the pitch radius of the external tooth side gear by an amount approximately equal to a common pitch diameter of the pinion gears for delivering a larger percentage of an input drive torque to the rear output drive shaft than to the front output drive shaft. The rear output drive shaft is mounted within the front output drive shaft and passes through a center of the external tooth side gear.

The bearing supporting the common carrier preferably includes a front bearing. The common carrier also preferably includes a front extended portion having an external bearing surface that forms a portion of the front bearing with the front end of the transfer case housing. The front extended portion also preferably has an internal bearing surface rotatively supporting the input drive shaft, which is coupled to the sun gear of the planetary gear unit.

In addition, the bearing supporting the common carrier preferably includes a rear bearing, and the common carrier also includes a rear extended portion having an external bearing surface that forms a portion of the rear bearing with the rear end of the transfer case housing. The rear extended portion preferably has an external bearing surface rotatively supporting the front output drive shaft and an internal bearing surface rotatively supporting the rear output drive shaft. According to this arrangement, both the rear extended portion of the common carrier and the rear output drive shaft extend through and beyond the front output drive shaft.

The common carrier preferably includes a first set of pockets supporting pinions of the single-pinion differential gear unit and a second set of pockets supporting planet gears of the planetary gear unit. The ring gear of the planetary gear unit is preferably alternately engageable with one of the transfer case housing and the common carrier for selectively delivering power from the input drive shaft to the front and rear output drive shafts at different speed ratios.

DETAILED DESCRIPTION

Figure 1:
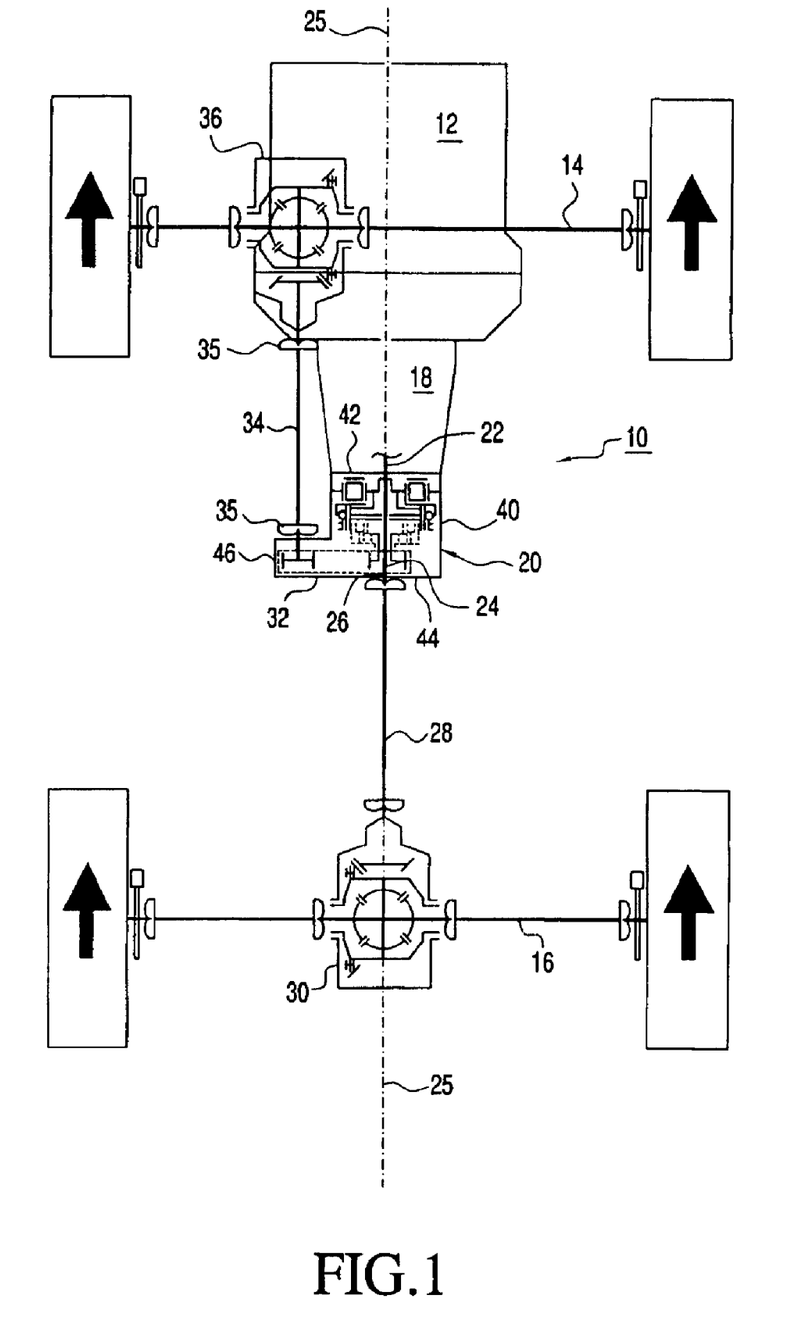
FIG. 1 is a diagram of an interaxle drive system in a layout that is particularly adapted to benefit from the present invention.

An exemplary all wheel drive (AWD) system is laid out in FIG. 1 featuring an interaxle drive system 10 for delivering power from a longitudinally mounted engine 12 to both a front axle 14 and a rear axle 16. A transfer case 20 appended to a transmission 18 connects an input drive shaft 22 from the transmission to a pair of concentric front and rear output drive shafts 24 and 26, which are better seen in FIG. 2. The input drive shaft 22 and the concentric output drive shafts 24 and 26 are aligned with a common axis of rotation 25. The rear output drive shaft 26 is connected directly with a rear propshaft 28 that delivers engine power to the rear axle 16 through a rear differential 30. Both the rear propshaft 28 and the differential 30 are also aligned with the common axis of rotation 25. However, a parallel drive connection (sprocket) 32 connects the front output drive shaft to a front propshaft 34 for delivering power to the front axle 14 through a front differential 36. The propshaft 34 is parallel but offset from the common axis 25.

Figure 2:
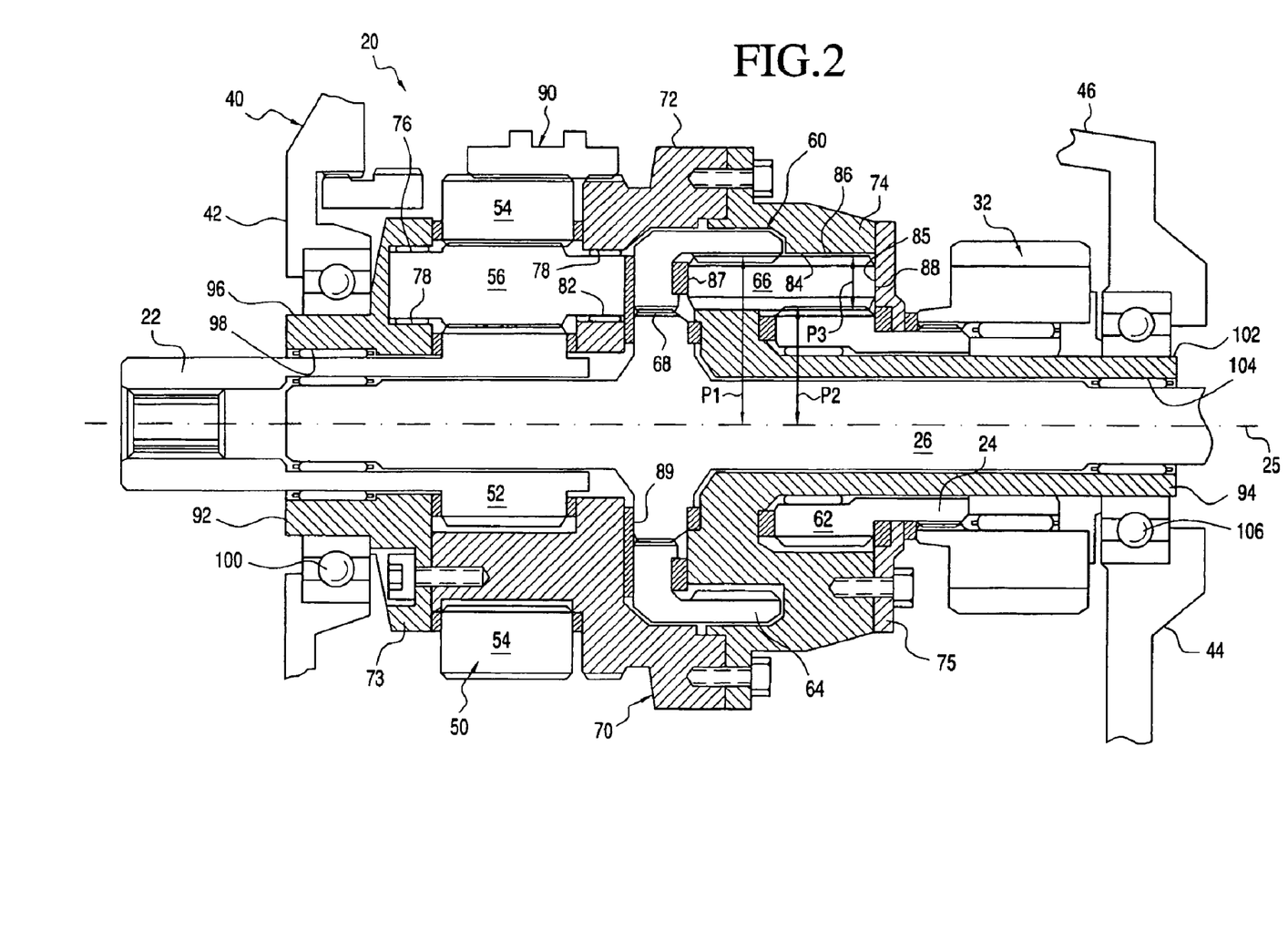
FIG. 2 is a cross-sectional view through an exemplary interaxle transfer case arranged in accordance with the invention.

The transfer case 20 has a housing 40 that includes a front end 42 through which the input drive shaft 22 is received, a rear end 44 through which the rear output drive shaft 26 emerges, and a lateral extension 46 between the front and rear ends 42 and 44 through which the drive connection 32 is made with the front output drive shaft 24. The lateral extension 46 is preferably adjacent to the rear end 44 of the transfer case housing 40 to more nearly equalize the length of the front propshaft 34 with the length of the rear propshaft 28. The additional length of the front propshaft 34 reduces angular errors that must be accommodated by universal joints 35 at opposite ends.

A planetary gear unit 50 within the transfer case housing 40 provides for delivering power from the input drive shaft 22 to the front and rear output drive shafts 24 and 26 at different speed ratios. Planetary gear unit 50 includes a sun gear 52 and a ring gear 54 interconnected by a plurality of planet gears 56. The input drive shaft 22 is connected to the sun gear 52 for rotation therewith about the common axis 25. As shown in FIG. 2, the sun gear can be formed as an integral part of the input drive shaft 22. However, the sun gear 52 could also be formed as a separate body that is coupled to the input drive shaft 22 by known means such as splines.

A single-pinion differential gear unit 60 within the transfer case housing 40 provides for unequally dividing drive torque between the front output drive shaft 24 and rear output drive shaft 26. The single-pinion differential gear unit 60 includes an external tooth side gear 62, an internal tooth side gear 64, and a plurality of pinion gears 66 each interconnecting the external and internal tooth side gears 62 and 64. The differential gear unit 60 is referred to as a "single-pinion" differential gear unit not because only one pinion is present but because the connection between the external and internal tooth side gears 62 and 64 is made directly by opposite sides of the individual pinion gears 66 (i.e., there are no intermediate pinion gear to pinion gear meshes).

The external tooth side gear 62 is connected to the front output drive shaft 24 and the internal tooth side gear 64 is connected to the rear output drive shaft 26. In the drawing of FIG. 2, the external tooth side gear 62 is formed as an integral portion of the front output drive shaft 24, and the internal tooth side gear 64 is shown coupled to the rear output drive shaft 26 by means of splines 68. Other choices for coupling connections can be made based on routine manufacturing, assembly, and design considerations. The two side gears 62 and 64 together with their connected output drive shafts 24 and 26 are both rotatable about the common axis 25.

For supporting a desired torque division between the two output drive shafts 24 and 26, the internal tooth side gear 64 has a pitch radius P1 that is larger than a pitch radius P2 of the external side gear 62 by an amount approximately equal to a pitch diameter P3 of the pinion gears 66. Neglecting friction, a nominal torque division between the front and rear output drive shafts 24 and 26 corresponds to the difference between the pitch diameters of their associated side gears 62 and 64. In the illustrated design, substantially more drive torque is delivered to the rear output drive shaft 26 than to the front output drive shaft 24 by a ratio that is preferably in the range of 60 to 40 or more.

Both the planet gears 56 of the planetary gear unit 50 and the pinion gears 66 of the single-pinion differential gear unit 60 are mounted within a common carrier 70. The carrier 70 can be assembled from two or more parts. In the embodiment shown in FIG. 2, the common carrier 70 is formed from four components—two body halves 72 and 74 and front and rear end caps 73 and 75 that are bolted together to form the equivalent of a single body. The two body halves 72 and 74 permit a wider range of assembly options for separately assembling the planetary gear unit 50 and the single-pinion differential gear unit 60.

Both the planet gears 56 and the pinion gears 66 can be mounted for rotation within the common carrier 70 in a variety of ways common to such gearing. In the embodiment shown, however, the planet gears 56 are formed with a pair of trunnions 76 for supporting rotation of the planet gears 56 within end pockets 78. Bearings 82 are mounted between the trunnions 76 and the pockets 78 to reduce friction.

Within the single-pinion differential gear unit 60, however, some friction is desired to support a wider range of torque divisions between the output drive shafts 24 and 26. Accordingly, the gearing components 62, 64, and 66 preferably have helical teeth, and the pinions 66 are preferably mounted directly within pockets 84 of the common carrier 70. Frictional forces are generated between top lands 86 and circumferential surfaces of the pockets 84 and between pinion ends 88 and corresponding thrust surfaces 85 and 87 at the ends of the pockets 84. A thrust plate 89 separates the internal side gear 64 of the differential gear unit 60 from the planet gears 56 of the planetary gear unit 50.

A slideable shifting mechanism 90 provides for alternately coupling the ring gear 54 of the planetary gear unit 50 with either the transfer case housing 40 or the common carrier 70. When connected to the common carrier 70, the entire planetary gear unit 50 rotates together with the common carrier 70 at the speed of the input drive shaft 22. When connected to the transfer case housing 40, however, the common carrier 70 rotates at a slower speed than the input drive shaft 22 in accordance with the relative rotation supported by the planet gears 56 between the sun gear 52 and the ring gear 54. The one-to-one speed ratio produced by coupling the ring gear 54 to the common carrier 70 is referred to as "high range". The greater than one gear ratio associated with coupling the ring gear 54 to the transfer case housing 40 is referred to as "low range".

In accordance with an improved mounting system, the common carrier 70 includes a front extended portion 92 and a rear extended portion 94. The front extended portion 92 includes an external bearing surface 96 that supports a front bearing 100 with the front end 42 of the transfer case housing 40. The front extended portion 92 of the common carrier 70 also includes an internal bearing surface 98 that rotatively supports the input drive shaft 22. The rear extended portion 94 of the common carrier 70 also includes an external bearing surface 102 and an internal bearing surface 104. The external bearing surface 102 supports a rear bearing 106 with the rear end 44 of the transfer case housing. In addition, the external bearing surface 102 rotatively supports the front output drive shaft 24 and parallel drive connection 32. The internal bearing surface 104 rotatively supports the rear output drive shaft 26.

In the configuration shown, the rear extended portion 94 of the common carrier passes through a center of the external tooth side gear 62 and extends concentrically between the front output drive shaft 24 and the rear output drive shaft 26. The rear extended portion 94 extends beyond the front output drive shaft 24 into engagement with the bearing 106 with the housing end 44. The output drive shaft 26 extends beyond the rear extended portion 94 of the common carrier 70 to make a connection not shown with the rear propshaft 28. The parallel drive connection 32, which is typically a sprocket drive, provides for connecting the front output drive shaft 24 with the front propshaft 34. The extended portions 92 and 94 of the common carrier in engagement with the bearings 100 and 106 provide for supporting both the various components of the planet gear unit 50 and single-pinion differential gear unit 60 within the transfer case housing 40, but also provide for supporting the input drive shaft 22 and the two output drive shafts 24 and 26. This arrangement allows the input and output drive shafts 22, 24, and 26 to be sized in accordance with their primary function for conveying drive power instead of also supporting the gearing units 50 and 60 within the transfer case as well as the parallel drive connection 32.

Figure 3:
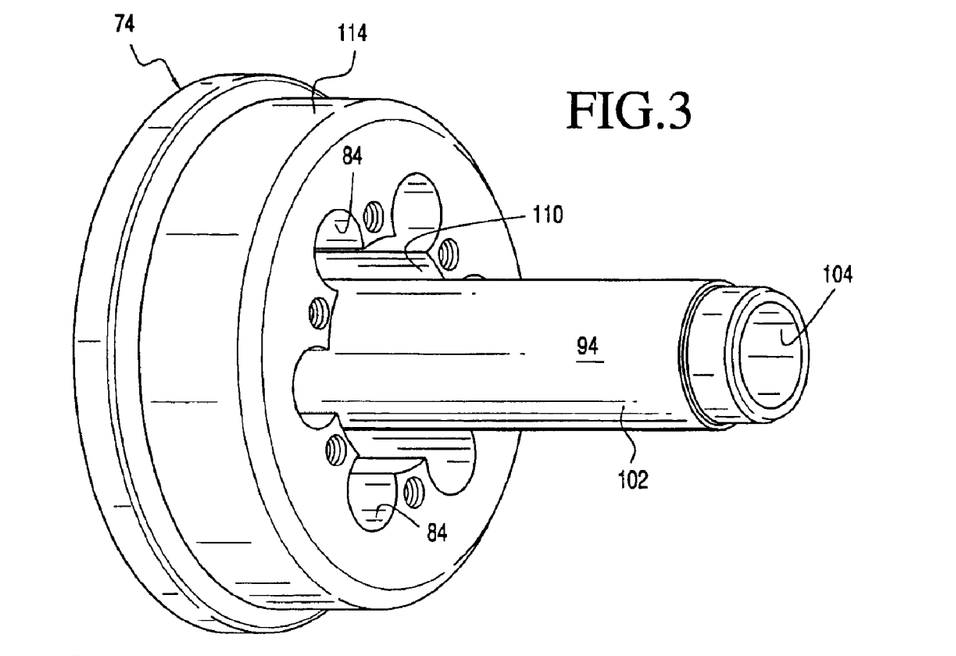
FIG. 3 is a perspective view of a carrier body half for supporting rotating components of the transfer case.
Figure 4:
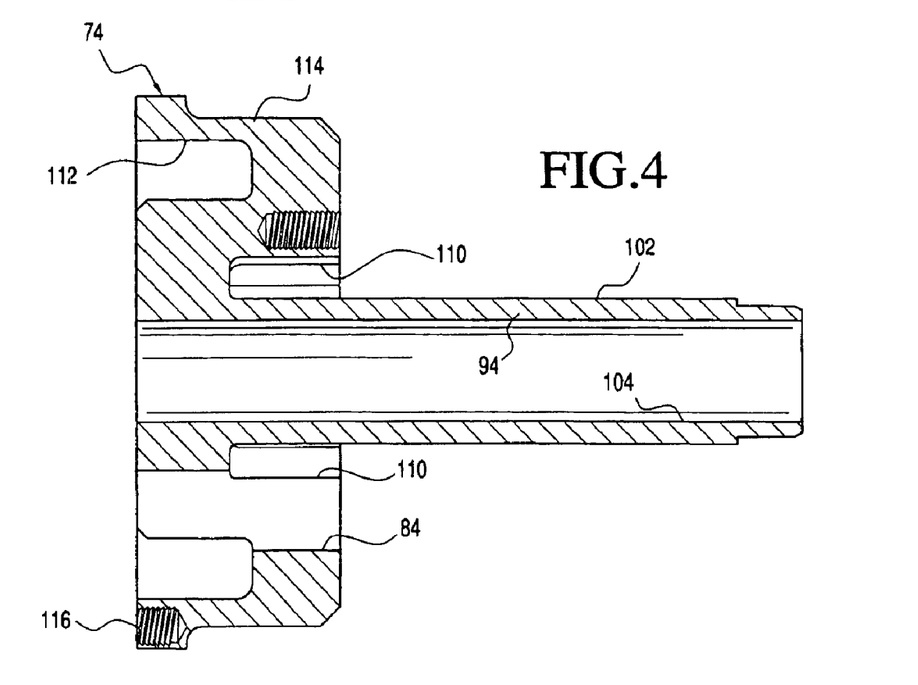
FIG. 4 is a transverse cross-sectional view through the carrier body half.

FIGS. 3 and 4 illustrate the special configuration of the carrier body half 74 that both supports and conveys power to the single-pinion differential gear unit 60. Within the body half 74 are the pockets 84 for carrying the pinion gears 66 as well as clearance spaces 110 and 112 for the external and internal tooth side gears 62 and 64. An outer shell 114 conveys power from the other carrier body half 72 (i.e., the output of the planetary gear unit 50) through the threaded connection 116 around the outside of the internal tooth side gear 64 to the pinion gears 66 within their pockets 84.

However, it is the rear extended portion 94 of the body half 74 that provides much improved support for the components of the common carrier 70 including the other components of the single-pinion differential gear unit 60, the two output drive shafts 24 and 26, and the parallel drive connection 32 to the front propshaft 34. The external bearing surface 102 not only supports the rear bearing 106 with the rear end 44 of the transfer case housing 40 but also rotatively supports the front output drive shaft 24 and the parallel drive connection 32. The internal bearing surface 104 rotatively supports the rear output drive shaft 26. In addition, the rear extended portion 94 provides support for the adjoining end of the other carrier half 72. As a part of the common carrier 70, the rear extended portion 74 provides structural support for the other moving components of the transfer case 40, allowing the other components to be designed and sized more in accordance with their primary functions.

Although the common carrier 70 is preferably formed with both the front extended portion 92 and the rear extended portion 94, benefits can still be obtained by incorporating just one or the other of the extended portions 92 and 94. Either extended portion 92 or 94 provides significant support for rotatably mounting the gear units 50 and 60 within the transfer case housing 40.

Figure 5:
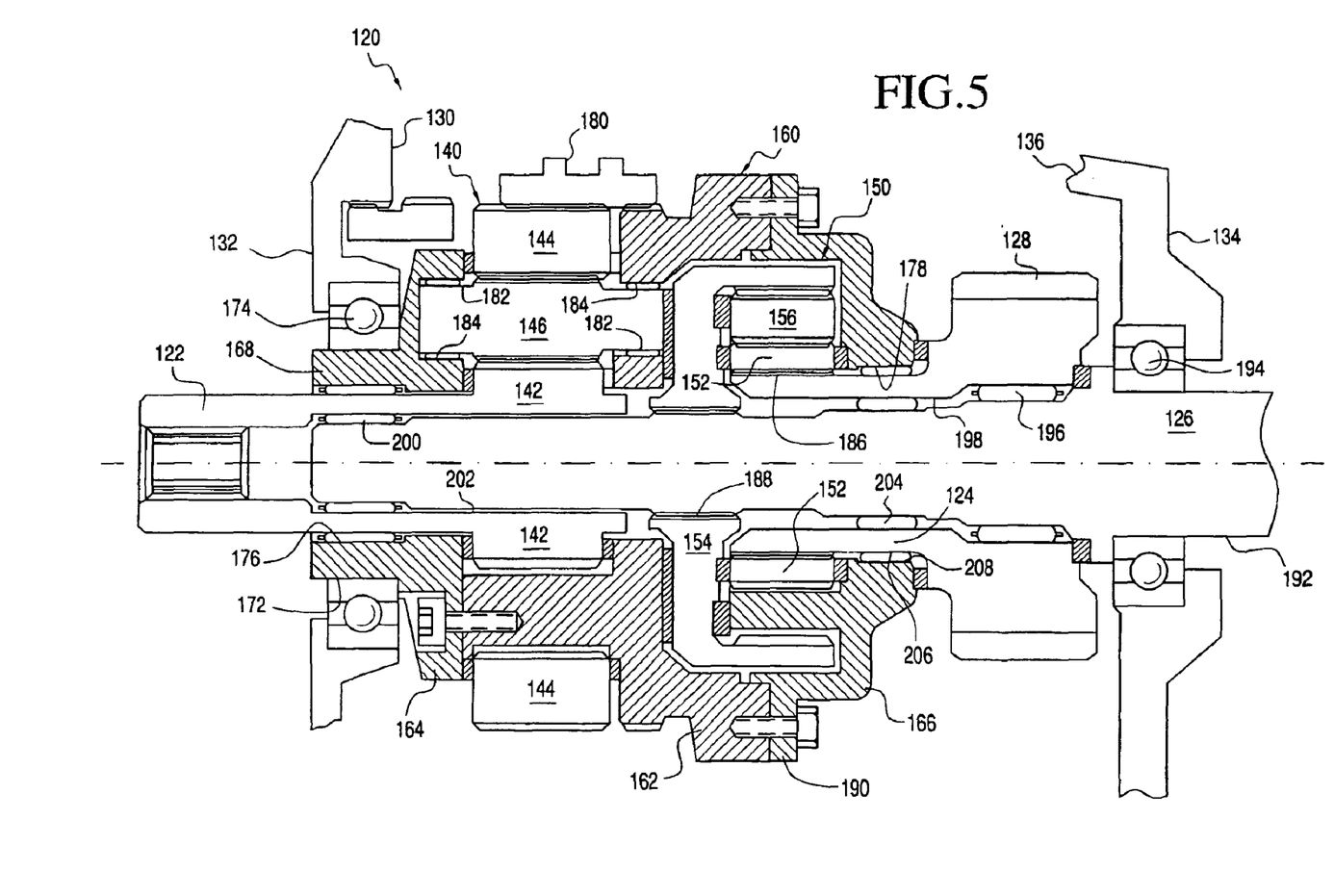
FIG. 5 is a cross section through another interaxle transfer case having a different supporting arrangement.

An alternative interaxle transfer case 120 shown in FIG. 5 receives drive power from the engine 12 from an input drive shaft 122 and splits the drive power between concentric front and rear output drive shafts 124 and 126. The front output drive shaft 124 is connected to the front propshaft 34 through a parallel drive connection (sprocket) 128, and the rear output drive shaft 126 is connected coaxially to the rear propshaft 28.

A transfer case housing 130 has a front end 132 that receives the input drive shaft 122 and a rear end 134 from which the rear output drive shaft 126 emerges. In between is a lateral extension 136 through which the parallel connection is made with the front output drive shaft 124. The input drive shaft 122 is operatively connected to the two output drive shafts 124 and 126 through the combination of a two-speed planetary gear unit 140 and a single-pinion differential gear unit 150. The two-speed planetary gear unit 140 changes a speed ratio between the input drive shaft 122 and the two output drive shafts 124 and 126 collectively. The single-pinion differential gear unit 150 supports a range of different speeds and torque distributions between the front and rear output drive shafts 124 and 126 with the torque distributions being influenced by its internal friction and gear ratios.

Both the two-speed planetary gear unit 140 and the single-pinion differential gear unit 150 are supported by a common carrier 160 that is divided for purposes of assembly into a main body 162 and front and rear end caps 164 and 166. The front end cap 164 includes a front extended portion 168 having an external bearing surface 172 that supports a front bearing 174 with the front end 132 of the transfer case housing 130. The front extended portion 168 also includes an internal bearing surface 176 that rotatively supports the input drive shaft 122. The rear end cap 166 includes an internal bearing surface 178 that is rotatively supported by the front output shaft 124.

The two-speed planetary gear unit 140 has a sun gear 142, a ring gear 144, and a plurality of planet gears 146 interconnecting the sun and ring gears 142 and 144. The sun gear 142 is formed integral with or is otherwise coupled to the input shaft 122. The planet gears 146 are formed with trunnions 182 that are received for rotation within pockets 184 formed in the common carrier 160. A sliding mechanism 180 alternately connects the ring gear 144 to either the common carrier 160 (as shown) or the transfer case housing 130. The former connection supports a "high range" drive connection that rotates the common carrier 160 at the same speed as the input drive shaft 122. The latter connection supports a "low range" drive connection that rotates the common carrier 160 slower that the rotational speed of the input drive shaft 122.

The single-pinion differential gear unit 150 includes an external tooth side gear 152, an internal tooth side gear 154, and a plurality of pinion gears 156 interconnecting the external and internal tooth side gears 152 and 154. The external tooth side gear 152 is coupled to the front output drive shaft 124 through a spline connection 186. The internal tooth side gear 154 is coupled to the rear output drive shaft 126 through a spline connection 188. The different pitch diameters of the external and internal tooth side gears 152 and 154 support torque differences between the front and rear output drive shafts 124 and 126, favoring torque distributions to the rear output drive shaft 126.

In both the high and the low range operation of the planetary gear unit 140, output drive torque from the input shaft 122 is directed to the common carrier 160. The main body 162 and the rear end cap 166 of the common carrier 160 form in the region where they are joined an outer shell 190 for conveying drive power from the planetary gear unit 140 around an outside of the internal tooth side gear 154 to the mountings for the pinion gears 156 of the differential gear unit 150. The drive torque reaches the front and rear output shafts 124 and 126 through the external and internal tooth side gears 152 and 154 of the differential gear unit 150.

An external bearing surface 192 of the rear output drive shaft 126 supports a bearing 194 with the rear end 134 of the transfer case housing 130. Other portions of the external bearing surface 192 of the rear output drive shaft 126 support a bearing 196 with an internal bearing surface 198 of the front output drive shaft 124 and support a bearing 200 with an internal bearing surface 202 of the input drive shaft 122. An external bearing surface 206 of the front output drive shaft 124 in turn supports a bearing 208 with the internal bearing surface 178 of the rear end cap 166.

Although the rear end cap 166 of the common carrier 160 is supported for rotation through the intermediacy of the rear output drive shaft 126, the front end cap 164 is more directly supported for rotation through the front extended portion 168 of the common carrier 160. The design also supports the parallel drive connection 128 to the front propshaft 34 from a location between the rear end cap 166 of the common carrier 160 and the transfer case housing 130.

Although the planet gears 56 and 146 of the planetary gear units 50 and 140 are supported for rotation within the common carriers 70 and 160 on integral trunnions 76 and 182, the planet gears 56 and 146 can be supported in a variety of other ways including on journal pins or on their top lands similar to the pinion gears 66 and 156 of the differential gear units 60 and 150. A similar range of mounting options are available for the pinion gears 66 and 156 of the differential gear units 60 and 150.

The gearing components of the planetary gear units 50 and 140 and the differential gear units 60 and 150 preferably have helical teeth for improved tooth contact. The helical teeth of the differential gear units 60 and 150 also generate thrust forces for increasing frictional resistance to rotation and increasing the range of available torque distributions between the front and rear output drive shafts 24, 26 or 124, 126.

I claim:

1. An interaxle drive system for delivering power to front and rear drive axles of a vehicle comprising:

a transfer case connecting an input drive shaft to concentric front and rear output drive shafts;

the input drive shaft and the concentric front and rear output drive shafts being aligned with a common axis of rotation;

the input drive shaft being arranged for connection to a source of power, the front output drive shaft being arranged for connection to the front axle, and the rear output drive shaft being arranged for connection to the rear axle;

the transfer case having a housing that includes a front end through which the input drive shaft is received, a rear end through which the rear output drive shaft emerges, and a lateral extension between the front and rear ends through which a drive connection is made with the front output drive shaft;

a planetary gear unit within the transfer case housing for delivering power from the input drive shaft to the front and rear output drive shafts at different speed ratios;

a single-pinion differential gear unit within the transfer case for unequally dividing drive torque between the front and rear output drive shafts;

the planetary gear unit including sun and ring gears interconnected by planet gears;

the single-pinion differential gear unit including internal and external tooth side gears interconnected by individual pinion gears;

a common carrier mounting both the planet gears of the planetary gear unit and the pinion gears of the single-pinion differential gear unit for rotation about their axes; and the common carrier being mounted for rotation on a bearing supported by the transfer case housing.

2. The system of claim 1 which the rear output drive shaft is aligned with a rear propshaft that delivers power to the rear axle, and the front output drive shaft is offset from a front propshaft that delivers power to the front axle.

3. The system of claim 2 in which the drive connection between the front output drive shaft and the front propshaft is adjacent to the rear end of the transfer case housing for more closely equating lengths of the front and rear propshafts.

4. The system of claim 3 in which the drive connection between the front output drive shaft and the front propshaft includes a member rotatively supported by the common carrier.

5. The system of claim 4 in which the member is a sprocket coupled for rotation with the front output shaft.

6. The system of claim 1 in which the internal tooth side gear is connected to the rear output drive shaft, and the external tooth side gear is connected to the front output drive shaft.

7. The system of claim 6 in which the internal tooth side gear has a pitch radius that is larger than a pitch radius of the external tooth side gear by an amount approximately equal to a common pitch diameter of the pinion gears for delivering a larger percentage of an input drive torque to the rear output drive shaft than to the front output drive shaft.

8. The system of claim 7 in which the rear output drive shaft is mounted within the front output drive shaft and passes through a center of the external tooth side gear.

9. An interaxle drive system for delivering power to front and rear drive axles of a vehicle comprising:

a transfer case connecting an input drive shaft to concentric front and rear output drive shafts;

the input drive shaft and the concentric front and rear output drive shafts being aligned with a common axis of rotation;

the input drive shaft being arranged for connection to a source of power, the front output drive shaft being arranged for connection to the front axle, and the rear output drive shaft being arranged for connection to the rear axle;

the transfer case having a housing that includes a front end through which the input drive shaft is received, a rear end through which the rear output drive shaft emerges, and a lateral extension between the front and rear ends through which a drive connection is made with the front output drive shaft;

a planetary gear unit within the transfer case housing for delivering power from the input drive shaft to the front and rear output drive shafts at different speed ratios;

a single-pinion differential gear unit within the transfer case for unequally dividing drive torque between the front and rear output drive shafts;

the planetary gear unit including sun and ring gears interconnected by planet gears;

the single-pinion differential gear unit including internal and external tooth side gears interconnected by individual pinion gears;

a common carrier mounting both the planet gears of the planetary gear unit and the pinion gears of the single-pinion differential gear unit for rotation about their axes; and the common carrier being mounted for rotation on a bearing supported by the transfer case housing, wherein the bearing supporting the common carrier includes a front bearing, and the common carrier includes a front extended portion having an external bearing surface that supports the front bearing with the front end of the transfer case housing.

10. The system of claim 9 in which the front extended portion has an internal bearing surface rotatively supporting the input drive shaft.

11. The system of claim 9 in which the bearing supporting the common carrier includes a rear bearing, and the common carrier includes a rear extended portion having an external bearing surface that supports the rear bearing with the rear end of the transfer case housing.

12. The system of claim 11 in which the rear extended portion has an external bearing surface rotatively supporting the front output drive shaft and an internal bearing surface rotatively supporting the rear output drive shaft.

13. The system of claim 12 in which both the rear extended portion of the common carrier and the rear output drive shaft extend through and beyond the front output drive shaft.

14. The system of claim 13 in which the internal tooth side gear is connected to the rear output drive shaft, the external tooth side gear is connected to the front output drive shaft, and the drive connection between the front output drive shaft and a front propshaft includes a member rotatively supported by the common carrier and coupled to the front output drive shaft.

15. The system of claim 1 in which the common carrier includes a first set of pockets supporting the pinion gears of the single-pinion differential gear unit and a second set of pockets supporting the planet gears of the planetary gear unit.

16. The system of claim 1 in which the ring gear is alternately engaged with one of the transfer case housing and the common carrier.

17. The system of claim 1 in which the side gears and pinion gears of the differential gear unit have helical teeth.

18. The system of claim 1 in which the sun gear, ring gear, and planet gears of the planetary gear unit have helical teeth.

19. An interaxle transfer case for an all wheel drive vehicle having a longitudinally mounted engine comprising:
a transfer case housing having front and rear ends;
an input drive shaft being received through the front end of the transfer case housing;
a rear output drive shaft making a coaxial output connection with respect to the input shaft through the rear end of the transfer case housing;
a front output drive shaft making a parallel offset connection with respect to the input shaft between the front and rear ends of the transfer case housing;
a planetary gear unit within the transfer case housing that is shiftable into a low range mode for producing a speed reduction from the input drive shaft to the front and rear output drive shafts;
the planetary gear unit including sun and ring gears interconnected by planet gears;
a single-pinion differential gear unit within the transfer case for unequally dividing drive torque between the front and rear output drive shafts;
the differential gear unit including internal and external tooth side gears interconnected by individual pinion gears;
a common carrier mounting both the planet gears of the planetary gear unit and the pinion gears of the single-pinion differential gear unit for rotation about their axes;
the planetary gear unit providing for conveying drive power from the input drive shaft to the common carrier;
the common carrier having an outer shell for conveying drive power from the planetary gear unit around an outside of the internal tooth side gear to the mounting for the pinion gears of the differential gear unit;
the external and internal side gears providing for conveying drive power from the differential gear unit to the front and rear output shafts; and
the common carrier being mounted for rotation on a bearing supported by the transfer case housing.

20. The transfer case of claim 19 in which the planetary gear unit is located adjacent to the front end of the transfer case housing, and the differential gear unit is located adjacent to the rear end of the transfer case housing.

21. The transfer case of claim 20 in which the parallel offset connection of the front drive shaft is made between the differential gear unit and the rear end of the transfer case housing.

22. The transfer case of claim 19 in which the ring gear is shiftable from a connection with the common carrier to a connection with the transfer case housing for operating in the low range mode.

23. The transfer case of claim 22 in which the sun gear is connected to the input drive shaft, the external tooth side gear is connected to the front output drive shaft, and the internal tooth side gear is connected to the rear output drive shaft.

24. The transfer case of claim 19 in which the common carrier includes an extended portion supporting a bearing with one end of the transfer case housing for rotatably supporting the common carrier within the transfer case housing.

25. The transfer case of claim 24 in which the extended portion supports a bearing with the front end of the transfer case housing.

26. The transfer case of claim 25 in which the extended portion includes:
an external bearing surface that forms a portion of the bearing with the front end of the transfer case housing, and
an internal bearing surface rotatively supporting the input drive shaft.

27. The transfer case of claim 25 in which the extended portion of the common carrier is a first of two extended portions, and a second of the two extended portions supports a bearing with the rear end of the transfer case housing for rotatably supporting the carrier within the transfer case housing.

28. The transfer case of claim 27 in which the second extended portion of the common carrier includes an external bearing surface that rotatively supports the front output drive shaft and an internal bearing surface that rotatively supports the rear output drive shaft.

29. The transfer case of claim 28 in which the external bearing surface of the second extended portion of the common carrier also supports the parallel offset connection of the front output drive shaft.

30. The transfer case of claim 19 in which the common carrier includes an extended portion supporting the parallel offset connection of the front output drive shaft.

31. The transfer case of claim 30 in which the common carrier includes an external bearing surface that supports the parallel offset connection of the front output drive shaft.

32. The transfer case of claim 19 in which the rear output drive shaft supports the parallel offset connection of the front output drive shaft.

* * * * *